(12) United States Patent
Schwaner et al.

(10) Patent No.: US 6,935,815 B2
(45) Date of Patent: Aug. 30, 2005

(54) CUTTING INSERT

(75) Inventors: Carsten Schwaner, Mülheim (DE); Thomas Braun, Mülheim (DE)

(73) Assignee: Widia GmbH, Essen (DE)

( * ) Notice: Subject to any disclaimer, the term of this patent is extended or adjusted under 35 U.S.C. 154(b) by 12 days.

(21) Appl. No.: 10/332,400

(22) PCT Filed: Jul. 19, 2001

(86) PCT No.: PCT/DE01/02818

§ 371 (c)(1),
(2), (4) Date: Jan. 7, 2003

(87) PCT Pub. No.: WO02/14006

PCT Pub. Date: Feb. 21, 2002

(65) Prior Publication Data

US 2004/0007115 A1 Jan. 15, 2004

(30) Foreign Application Priority Data

Aug. 18, 2000 (DE) ........................................ 100 40 910

(51) Int. Cl.$^7$ ............................................. B23B 27/22
(52) U.S. Cl. ...................................... 407/114; 407/116
(58) Field of Search ............................ 407/48, 53, 113, 407/114, 116

(56) References Cited

U.S. PATENT DOCUMENTS

| | | | | | |
|---|---|---|---|---|---|
| 4,159,884 A | * | 7/1979 | Schott | ........................ | 407/113 |
| 4,315,706 A | * | 2/1982 | Erkfritz | ....................... | 407/101 |
| 4,583,887 A | * | 4/1986 | Wertheimer | ................ | 407/116 |
| 4,969,779 A | * | 11/1990 | Barten | ......................... | 407/114 |
| 5,230,591 A | * | 7/1993 | Katbi et al. | .................. | 407/114 |
| 5,449,255 A | * | 9/1995 | Katbi et al. | .................. | 407/114 |
| 5,460,464 A | * | 10/1995 | Arai et al. | .................... | 407/114 |
| 5,725,334 A | * | 3/1998 | Paya | ........................... | 407/117 |
| 5,807,031 A | * | 9/1998 | Arai et al. | .................... | 407/113 |
| 5,876,160 A | | 3/1999 | Johnson | | |
| 5,915,889 A | | 6/1999 | Kress et al. | | |
| 5,947,651 A | * | 9/1999 | Murakami et al. | .......... | 407/114 |
| 6,079,912 A | | 6/2000 | Rothballer | | |
| 6,543,970 B1 | * | 4/2003 | Qvarth et al. | ............... | 407/114 |

FOREIGN PATENT DOCUMENTS

| | | | |
|---|---|---|---|
| DE | 3326667 | * | 3/1984 |
| DE | 3332821 | * | 3/1984 |
| DE | 196 53 921 | | 7/1997 |
| DE | 197 04 931 | | 3/1998 |
| DE | 197 43 971 | | 4/1999 |
| EP | 125568 | * | 11/1984 |
| EP | 0 955 117 | | 11/1999 |

* cited by examiner

*Primary Examiner*—Derris H. Banks
*Assistant Examiner*—Dana Ross
(74) *Attorney, Agent, or Firm*—Herbert Dubno

(57) ABSTRACT

A cutting insert is formed with a central planar support face, at least three cutting edges spaced outwardly from and around the support face and forming corners, and a land extending along each cutting edge between the respective corners and projecting from the respective cutting edge inward toward the support face. The land has a central region of a relatively great width measured perpendicular to the respective cutting edge and a pair of side regions flanking the central region and each of a relatively narrow width. The great width is equal to between 1.5 and 4 times the narrow width, and the land forms with a plane of the support face an outwardly open negative land angle of at least 0°.

16 Claims, 3 Drawing Sheets

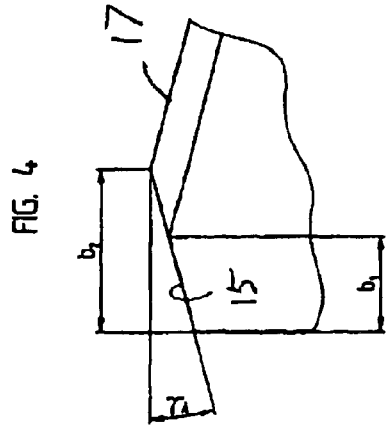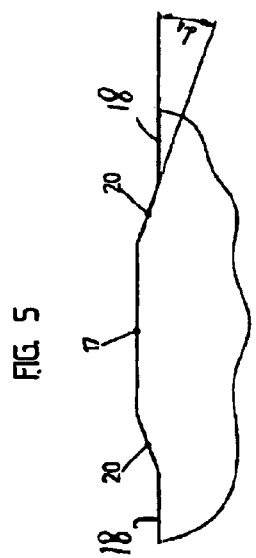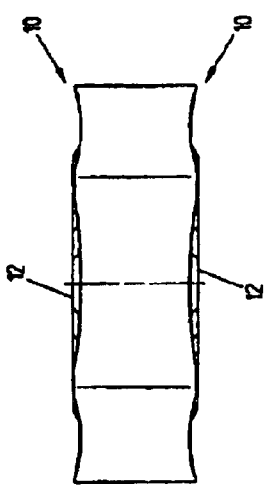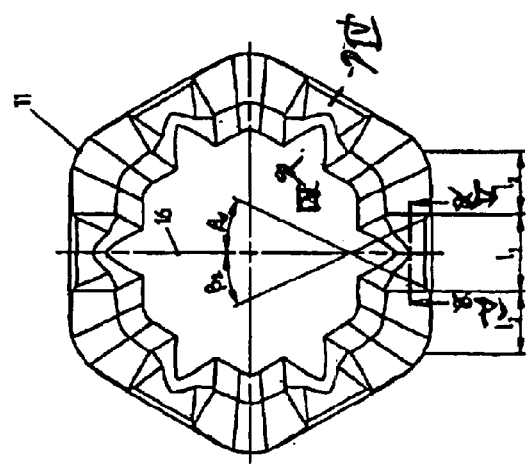

CUTTING INSERT

CROSS REFERENCE TO RELATED APPLICATIONS

This is the US national phase of PCT application PCT/DE01/02818 filed 19 Jul. 2001 with a claim to the priority of German application 100 40 910 filed 18 Aug. 2000.

FIELD OF THE INVENTION

The invention relates to a cutting insert for the material-removing machining of a workpiece, in particular for roughing, wherein cutting edges extend between cutting corners that are curved or formed of short straight sections extending at obtuse angles to one another.

BACKGROUND OF THE INVENTION

Such cutting inserts, which if necessary have a peripheral land, are known in the art. In order to obtain a good surface quality when doing rough or finish machining, German 197 03 569 suggests providing a convexly shaped auxiliary cutting edge adjacent a planar free face. The cutting insert described in this publication can be made hexagonal seen from above on the cutting face, that is it has altogether six cutting edges of the same length and of which at least three are constituted as main cutting edges and three as auxiliary cutting edges. A concave chip-shaping groove extends on the cutting face parallel to the auxiliary cutting edges. Level with a perpendicular from the center of each main cutting edge and spaced from each main cutting edge there is preferably a raised chip-shaping element that is in particular formed as a nose-shaped projection of a central raised cutting-face plateau. This projection can have a three-corner planar top surface in the cutting-face plateau whose corners are pointed at the main cutting edges and of which side lines ending at these corners define angled flanks reaching to the cutting face, preferably at flank angles of 40° to 50°.

OBJECT OF THE INVENTION

It is an object of the present invention to optimize the above-described cutting insert in particular for milling of grey cast parts.

SUMMARY OF THE INVENTION

This object is achieved by the cutting insert that is characterized according to the invention in that a land is provided on the cutting face that extends along the cutting edges and that this land has central regions each flanked by a pair of side regions and each central region has a width equal to between 1.5 and 4 times, preferably 2.5 to 3.5 times, the width of the respective side regions.

This cutting insert is particularly effective at face-milling grey cast-iron or cast-steel bodies having a hard cast skin. The orientation of the central wide regions is such that in the region of maximum cut depth where the cutting edge actually contacts the cast skin, the cutting edge is protected by the wide land region against premature wear or actual breakage.

Thus the wide land regions extend over between ⅓ and ½ of the length of the respective cutting edges. In this manner the cutting inserts can be used for right- and left-handed turning operations, the wide land region always being in the center of the cutting edge, that is where according to the selected maximum cut depth the cutting edge for example when machining an engine block contacts a cast skin or the chip cut from it. The land width narrows in the corner regions to the smaller width $b_1$ and extends to the corner to a width 0, but can also extend as a land with the width $b_1$ also in the corner.

According to a further embodiment of the invention a land angle is constant over both regions or changes at most ±10° over the length of the cutting edges. The land angle is either 0° or less, preferably between −10° and −20°.

The wide land regions narrow away from the respective cutting edges, the extent of narrowing being defined by borders of the wide regions that extend at angles between 3° and 30°, preferably between 15° and 25°, to perpendiculars from centers of the respective cutting edges. This cutting edge narrowing or the arrangement of the borders is preferably also mirror symmetrical to the cutting-edge center. Alternatively it is possible to form the land such that between the smaller and the wider regions there is a smooth transition.

A first chip-shaping element with a surface extending at an angle of 0° to −20° extends rearward along the entire length of each of the wide land regions, the angle of this surface relative to the cutting-face angles of the adjacent region can be the same or larger, preferably at least 10° more. The planar flanks extend from both sides of each of the first chip-shaping elements downward to a respective surrounding cutting face, preferably at an angle between 10° and 30°. Like the wide land regions, the first chip-shaping elements are each mirror-symmetrical to the respective cutting-edge center perpendicular.

Preferably a central raised cutting-face plateau is spaced from highest points of the cutting edges and is provided in line with each of the cutting-edge center perpendiculars with a respective nose-shaped projection that preferably projects into the respective first chip-shaping element. The nose-shaped projections each have a generally triangular planar surface level with the cutting-face plateau plans, have a point directed at the respective cutting edge, and have angled flanks extending from borders leading from the respective point to the respective cutting face, preferably at a flank angle between 40° and 50°

The cutting corners between adjacent cutting edges are rounded or formed of a plurality of straight sections extending at obtuse angles to one another.

The cutting insert has a three-, four- or six-sided shape, preferably with upper and lower usable cutting edges.

The cutting edges are shaped concave, convex, arcuate, or straight seen in top view on the adjacent free face, the wide land region following the shape of the cutting edge.

BRIEF DESCRIPTION OF THE DRAWING

Further advantages and embodiments of the invention are described in the following with reference to the drawing. Therein:

FIG. 2 is an edge view of the cutting insert according to FIG. 1;

FIG. 3 is a top view of the cutting insert according to FIGS. 1 and 2;

FIG. 4 is a partial section along line IV—IV of FIG. 3;

FIG. 5 is a partial section along line V—V of FIG. 3;

SPECIFIC DESCRIPTION

Figure 1:
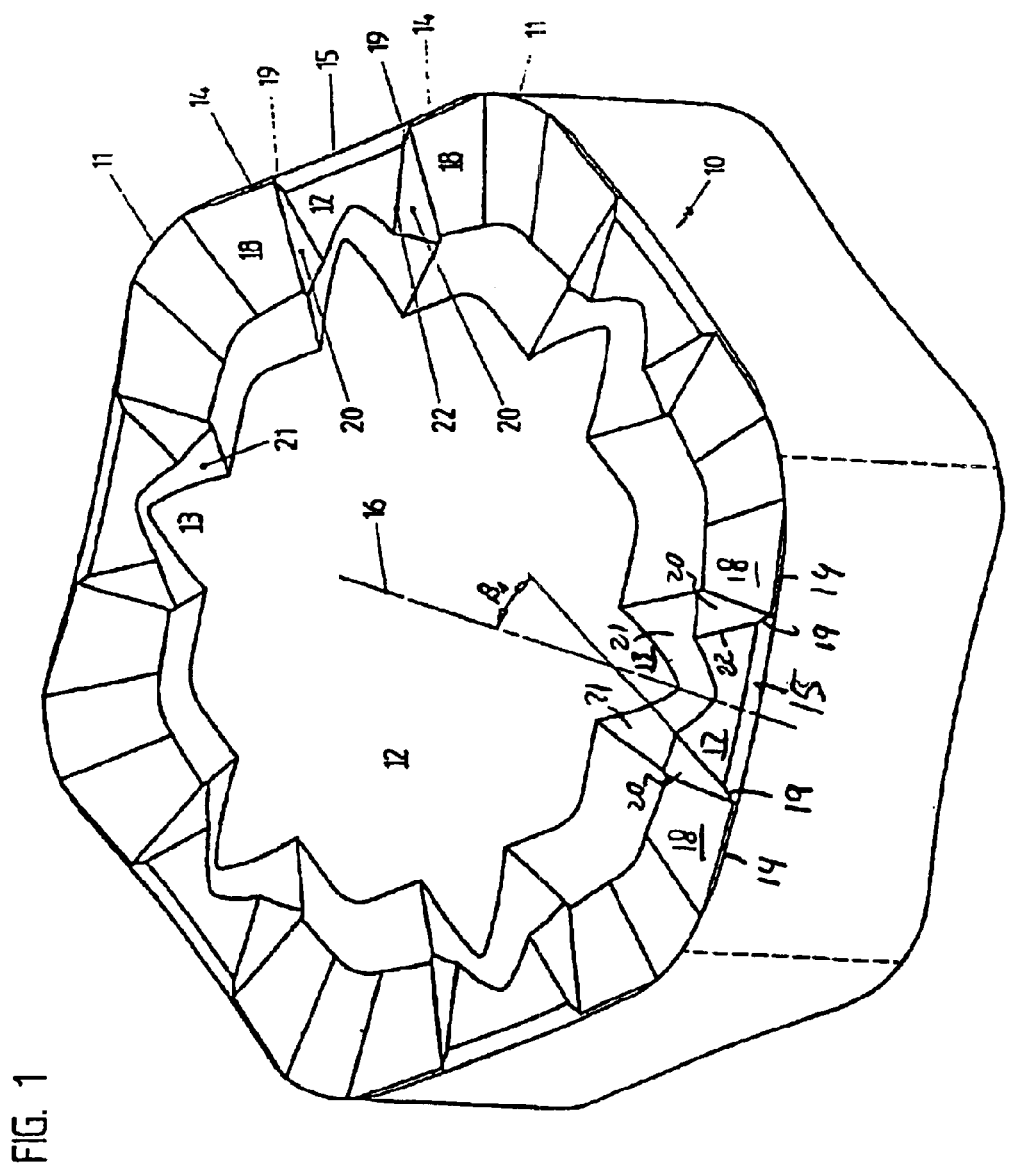
FIG. 1 is a perspective view of a cutting inset according to the invention with a hexagonal shape.

As shown in FIGS. 1 to 3 the cutting insert has a uniform hexagonal shape with six straight cutting edges 10 of the same length that each extend at an obtuse angle of 120° to the adjacent cutting edges and that meet the adjacent cutting edges at rounded cutting corners 11. The cutting-corner radius of curvature is between 0.3 and 0.9 mm. The illustrated hexagonal cutting insert is formed as a two-sided indexable cutting insert, that is it has six cutting edges 10 on its upperside and on its lower side. The support faces for the cutting insert are constituted by top- and bottom-side support-face plateaux 12 that have nose-shaped projections 13 with points directed at the centers of the respective cutting edges 10.

A land that runs along all the cutting edges on the cutting face is the object of the present invention. This land is not, as in the prior-art cutting inserts, of uniform shape along the main cutting edges 10 but has central wide regions 15. These wide regions 15 each have a length $1_1$ (see FIG. 3), which extends about a third of the distance between the centers of the flanking corners 11, a width $b_2$ that is between 1.5 and 4.5 times, preferably 3 times, a land width $b_1$ of adjacent side land regions 14 of length $1_2$ that run to the corners 11. The central wide land regions 15 are mirror symmetrical to perpendiculars 16 from the centers of the respective cutting edges 10, with a land angle $Y_1$ that is preferably negative and that is the same for land regions 14 and 15. The angle $Y_1$ shown in the embodiment (see FIG. 4) is equal to 15°. The width $b_2$ in the embodiment is 0.3 mm and the width $b_1$ equals 0.1 mm.

At the rear of the wide land region 15 there is a planar chip-shaping face or element 17 that extends inward toward the support face 12 and that is, because of the widened region 15, raised relative to flanking cutting-face regions 18 extending inward from the narrow land regions 14. Lateral borders 19 of the wide land regions 15 are inclined to the central perpendiculars by angles $\beta_1$ and $\beta_2$ between 15° and 25°, and as a result of the symmetry on the central perpendiculars 16 the angle $\beta_1$ equals $\beta_2$. Planar flanks 20 extend downward from the chip-shaping element 17 to the adjacent regions 18 at an angle $\alpha_1$ between 10° and 30°. In this embodiment the angle $\alpha_1$ is equal to about 25°.

Each of the nose-shaped projections 13 forms with the central raised plateau 12 a planar support face. Side flanks 21 of the nose-shaped projections 13 and the remaining flanks extending from the central plateau 12 to the cutting face regions 17, 18, and 20 that are active during machining extend at an angle between 40° and 50°. Borders 22 of the chip-shaping elements 17 are inclined to the respective central perpendiculars 16 like the above-described borders 19 at acute angles $B_1$ and $B_2$ that arre the same as the described angles $\beta$and $\beta_2$.

The widened land can also be provided on cutting inserts with three or four corners.

Figure 6:
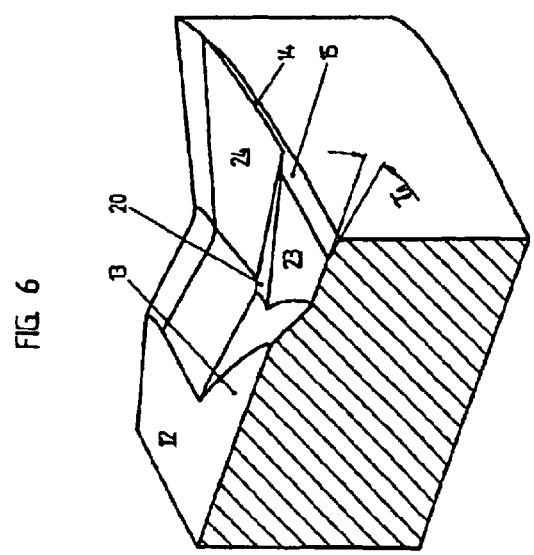
FIG. 6 is a further embodiment of a cutting insert according to the invention in partial section.

Another chip-shaping element is shown in FIG. 6 where rearward of the wide land region 15 there is a cutting-face region 23 raised above a region 24 and if desired formed as an arcuate groove extending toward the cutting edge.

The cutting edges 10 can as shown in the embodiment be straight or alternatively (seen in side view down on the free face) concave or convex. Even in such an arrangement a land extends on the cutting face along the cutting edge 10 and is widened in a central region 15 at the same land angle.

Figure 7:
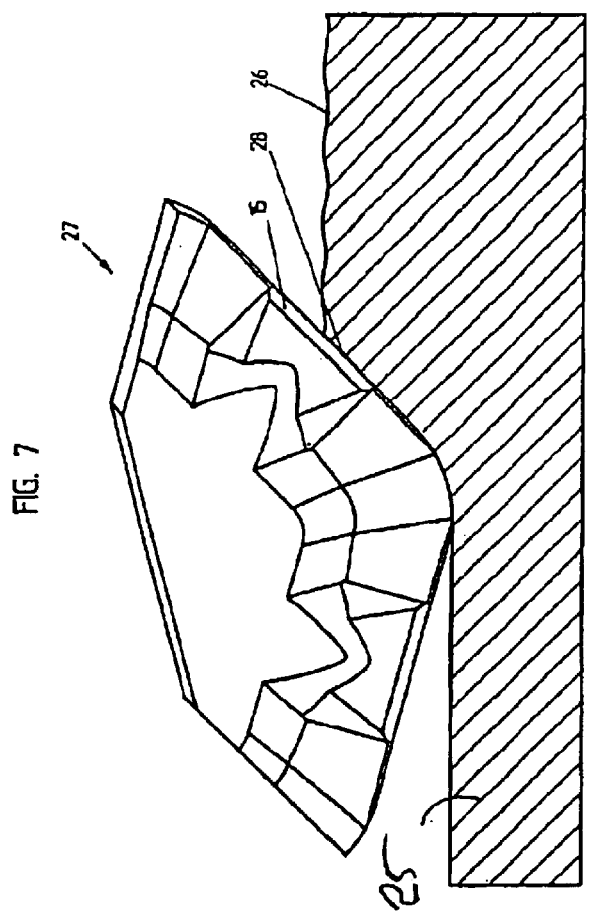
FIG. 7 is a partial section of a cutting insert according to the invention according to FIGS. 1 to 5 during machining.

The action of the land shape according to the invention is shown by way of example in FIG. 7. During machining of a grey-cast workpiece 25 with a skin 26 on its surface the cutting insert 27 face-mills as shown in FIG. 7. The cutting-edge portion shown at 28 serves as a cutter. In a region of maximum cutting depth that is where the cutting edge 28 contacts the cast skin 26 of the chip cut from it, there is the wide land 15 which protects the cutting edge 28 against premature wear.

What is claimed is:

1. A cutting insert formed with:
   a central planar support face;
   at least three cutting edges spaced outwardly from and around the support face and forming corners; and
   a land extending along each cutting edge between the respective corners, projecting from the respective cutting edge inward toward the support face, and constituted by a central region of a relatively great width measured perpendicular to the respective cutting edge and a pair of side regions flanking the central region and each of a relatively narrow width, the great width being equal to between 1.5 and 4 times the narrow width, the land forming with a plane of the support face an outwardly open negative land angle of at least 0°, each central region having measured parallel to the respective cutting edge a length equal to between one-third and one-half of a length of the respective cutting edge.

2. The cutting insert defined in claim 1 wherein the great width is equal to between 2.5 and 3.5 times the narrow width.

3. The cutting insert defined in claim 1 wherein each central region is substantially symmetrical to a line bisecting and perpendicular to the respective cutting edge.

4. The cutting insert defined in claim 1 wherein the land angle varies by at most 10° along each respective cutting edges.

5. The cutting insert defined in claim 4 wherein the land angle is between −10° and −20°.

6. The cutting insert defined in claim 1 wherein each central region has end edges extending transversely from the respective cutting edge and each extending at an end-edge angle of between 3° and 30° to a line bisecting and perpendicular to the respective cutting edge.

7. The cutting insert defined in claim 6 wherein the end-edge angles are between 15° and 25°.

8. The cutting insert defined in claim 6 wherein the end edges are symmetrical to the line.

9. The cutting insert defined in claim 1 wherein the cutting insert is further formed with
   respective chip-shaping faces extending inward from the central region to the support face, extending the full lengths of the respective central regions, and having angles of between 0° and 20°.

10. The cutting insert defined in claim 9 wherein the chip-shaping faces are symmetrical to a line bisecting and perpendicular to the respective cutting edge.

11. The cutting insert defined in claim 1 wherein the support face is formed with respective coplanar nose-shaped projections extending outward toward the cutting edges.

12. The cutting insert defined in claim 1 where there are six such cutting edges.

13. A cutting insert formed with:
   a central planar support face;
   at least three cutting edges space outwardly from and around the support face and forming corners;
   a land extending along each cutting edge between the respective corners, projecting from the respective cutting edge inward toward the support face, and constituted by a central region of a relatively great width measured perpendicular to the respective cutting edge and a pair of side regions flanking the central region and each of a relatively narrow width, the great width being equal to between 1.5 and 4 times the narrow width, the land forming with a plane of the support face an outwardly open negative land angle of at least 0°;

respective chip-shaping faces extending inward from the central regions to the support face, extending the full lengths of the respective central regions, and having angles of between 0° and 20°; and respective pairs of planar flanking the chip-shaping faces and extending downward to the support face.

14. The cutting insert defined in claim 13 wherein the planar flanks form angles of between 10° and 30° with the support face.

15. A cutting insert formed with:

at least three cutting edges forming corners; and a land extending along each cutting edge between the respective corners and constituted by a central region of a relatively great width and a pair of side regions flanking the central region and each of a relatively narrow width, the great width being equal to between 1.5 and 4 times the narrow width;

a central raised planar support face formed with respective coplanar and generally triangular projections extending outward toward the cutting edges and having edges extending; and respective pairs of flanks flanking the projections and extending therefrom toward the respective cutting edges.

16. The cutting insert defined in claim 15 wherein the flanks extend at angles of between 40° and 50°.

\* \* \* \* \*